Patented Feb. 15, 1944

2,341,986

UNITED STATES PATENT OFFICE 2,341,986

THERAPEUTIC CONFECTION

William J. Hale, Midland, Mich., assignor to The National Agrol Company, Washington, D. C., a corporation of Delaware No Drawing. Application March 27, 1941, Serial No. 385,539

6 Claims. (Cl. 167—82)

This invention relates to confections, more particularly to an improved confectionary containing beneficial vegetable extracts.

It is well known that grass holds much of needed foods for human consumption. Ready means, however, of effecting the proper chemical transformations to suit human digestion is not altogether present. Albeit the universal catalyst of the green leaf, the bluish green chlorophyll, is not generally looked upon as a food substance. Its function primarily involves the reduction of carbonic acid into carbohydrates, such as sugars, starch and cellulose, which are known to constitute a goodly portion of food substance for humans and the exclusive food for herbivorous animals. In this function one form of chlorophyll, known as chlorophyll-a, is transformed into another, known as chlorophyll-b, which latter in the presence of catalysts called carotinoids (embracive of long unsaturated carbon chains as lycopene and the same with each end cyclized into benzenoid rings as beta-carotene, and others as xanthophyll which is a dihydroxy derivative of alpha-carotene) is reconverted into chlorophyll-a to serve again in its reducing capacity.

The chemical structure of chlorophyll was clearly indicated in 1913 by the work of Richard Willstaetter. Within this molecule one atom of the element magnesium constitutes the central core and is looked upon as initially reacting with carbonic acid in the leaf and, through the agency of sunlight, made to reduce this to carbohydrates with an evolution of oxygen. Closely analogous to the structure of chlorophyll is the structure of haemoglobin, the red pigment of the blood, as demonstrated in 1910 by Hans Fischer with the exception that an atom of the element iron constitutes in haemoglobin the central core of this complex organic molecule, whereas magnesium occupies the same relative position in the molecule of chlorophyll. A function of the iron atom in haemoglobin appears primarily to be as an oxygen carrier; its reaction with oxygen leading first to an oxy-iron complex which later is deprived of this oxygen in the circulatory system.

Along with chlorophyll and the carotinoids, beta-carotene (of long aliphatic chain and two benzenoid end groups) is possibly the most active. It is the forerunner of a fission into two identical hydroxylated shorter carbon chains (each now with only one benzenoid group) and known as vitamin A, that vitamin responsible for generous growth factors in the animal world.

In the process of digestion it is amply demonstrated that the chlorophyll molecule undergoes at first only partial rupture and from such ruptured molecules something akin to haemoglobin by way of haematin is formed. This has led medical men to study the effect of chlorophyll in the human system. It was found that chlorophyll had many apparent functions. First, it was found that chlorophyll apparently strengthened cell walls; second, that it increased their resistance to bacterial growth; and third, that it materially reduced infectious disorders, such as pyorrhea when sufficient quantities of chlorophyll solutions were applied to the gums. See reports in American Journal of Surgery (July 1940) and Science Service (March 15, 1941) actually testifying to relief of sinus infections by application of chlorophyll packs; see also the United States patent to Gruskin 2,120,667. Similarly the use of chlorophyll for the enhancement of food products has been described in the United States patent to Peebles 2,069,388.

In view of such and related facts it has now been found that to secure ideal conditions under which the curative powers of chlorophyll may best be utilized it is desirable to duplicate, as closely as possible, the exact mechanism as applied by nature, namely, a balanced proportion of chlorophyll, xanthophyll and the carotinoids in general. To this end it is advantageous to withdraw much of the fluids and catalysts within the green leaves of growing plants. When once this mixture is secured its applications should be administered in more or less continuous procedure. When applications to oral and digestive tracts are desired, the administration of such natural extracts can well be carried out by means of any suitable confectionary impregnated with the chlorophyll-carotinoid complex infusions or more particularly by means of gum drops or other more slowly consumed confectionary and still more particularly by means of gum chicle and similar products incorporated with the said chlorophyll-carotinoid infusion.

In carrying out the invention fresh green leaves, such as spinach, or alfalfa and the like are thoroughly macerated to break down the repositories of the chlorophyll complexes known as chloroplasts. By means of vegetable oils, and fats, such as butter fat, a considerable portion both of the chlorophyll complex and the carotinoid complex can be simultaneously withdrawn but such extracts are not particularly serviceable for the securement of the mixed complexes we can advantageously employ in confectionary. In the preferred method several solvents are used in turn. Initially ethyl alcohol may be utilized to remove chlorophyll and xanthophyll in the presence of water; secondly a hydrocarbon, such as benzene or even ligroin may be used to withdraw the carotinoids (other good solvents for the latter are chloroform and carbon bisulphide). In general the use of two distinct low boiling solvents of aliphatic or aromatic character abundantly suffices for the removal of the greater part of the chlorophyllic and carotinoid complexes the solvents may be employed in any desired effective ratio to the vegetable matter to be extracted. In ordinary circumstances 5 or more volumes of solvent may be used per volume of vegetable material. The infusions thus secured are preferably centrifuged and the extracts mixed and carefully dried in vacuo. The residue constitutes what, for the sake of a term, may be called chlorophyll-carotinoid complex and is incorporated within the softened gum chicle before its final preparation for the market. At no time need there be more than approximately 1% of chlorophyll-carotinoid complex within the chicle gum or confectionary; otherwise bitterness becomes too accentuated. The gum may be made up by methods well-known in the art, as for example, by adding dried chicle to a boiling mixture of glucose and sugar in the usual ratio of about 6 pounds of sugar, 5 pounds of glucose and 7 pounds of dried chicle. The resulting material may be kneaded with a suitable amount of powdered sugar and during the kneading operation the extracted mixed complex may be incorporated.

For certain purposes where medical rather than confectionary aims are paramount there need be no upper limit to the percentage content of chlorophyll-carotinoid complex. It is apparent that dextrose or other sugars may be added to the macerated green leaves with varying amounts of water and alcohol and the sugar-containing infusion clarified by centrifuging and evaporating to small bulk which may be employed directly in the manufacturing of confectionary, cakes, jellies and the like.

Practically speaking, the procedure above outlined is essentially a breaking down of cell walls of the growing leaf and removal from ruptured cells of all save the cellulosic and starchy residue.

It is known that the astringent properties of certain components of citrus fruits exert a hardening tendency on the gums. Thus the oil from grapefruit rind is decidedly advantageous to oral hygiene. It is also contemplated that gum chicle impregnated with this chlorophyll-carotinoid complex may be given additional flavor by incorporation therein of small amounts of vegetable oils more particularly comprising the oils of citrus fruit rind.

The described method provides a chicle-base gum with just those ingredients found in the growing leaves of nature and in the same proportions as nature dictates. So also with confectionary in general. Constant contacting of chicle gum containing the chlorophyll-carotinoid complex with the teeth seems to reduce the concentration of the chlorophyll complex only slowly after the initial effect of saliva on the incorporated ingredients, thus making possible a considerably prolonged application of said chlorophyll-carotinoid complex in touch with gums and teeth. Due to slight alkalinity of saliva it is perfectly possible after several hours that the first steps in digesting chlorophyll will occur; by this step the alcohol phytol is liberated and a simple complex known as chlorophyllin remains, later to be broken down in the acid fluids of the stomach. It is clear that the use of chicle bases serves effectively to keep the teeth in closer and more continued contact with that portion of green leaf extract seemingly proficient in destroying undesirable germs likely to infect the mouth. Thus pyorrhea may be simply treated by use now and then of a chlorophyll-carotinoid complex incorporated in chewing gum base.

The invention also comprehends the use of a partly digested chlorophyll-carotinoid complex, such as results upon treating the extract of freshly macerated green leaves with peptic juices and even with dilute acids. The resultant product can be used in concentrated form just as has been suggested for the extract itself. When incorporated with chicle base gum the softening of the same in the mouth permits a somewhat greater withdrawal of a portion of the more soluble components of the partly digested chlorophyll-carotinoid complex, but the bluish green chlorophyll and yellow carotinoid pigments still largely persist and give to the chewing gum the same green color as obtained in the use of a phyto gum made from the direct extract.

While preferred modifications of the invention have been described it is to be understood that these are given didactically to explain the underlying principles of the invention and not as limiting the useful scope of the invention to the illustrative examples.

I claim:

1. A confection comprising chicle gum in which is homogeneously incorporated a predetermined proportion of chlorophyll and carotinoid complexes derived from extraction from vegetable matter.

2. A composition comprising a gum base in which is incorporated the chlorophyll-carotinoid extract of vegetables substantially free from cellulosic material.

3. A method of producing a confection of therapeutic value which comprises separately extracting chlorophyll and carotinoid complexes from vegetables substantially free from cellulosic materials and incorporating the extracted complexes in a confection.

4. A method of producing a confection of therapeutic value which comprises treating vegetable materials with selective solvents to extract separately chlorophyll and carotinoid complexes substantially free from cellulosic material purifying the extracts and incorporating the purified product in a confection.

5. A method of producing a confection of therapeutic value which comprises treating vegetable materials with selective solvents to extract separately chlorophyll and carotinoid complexes substantially free from cellulosic material purifying the extracts and incorporating the purified product in a gum.

6. A method of producing a confection of therapeutic value which comprises treating vegetable materials with selective solvents to extract separately chlorophyll and carotinoid complexes substantially free from cellulosic material purifying the extracts and incorporating the purified product in chicle gum.

WILLIAM J. HALE.